United States Patent
Nakanishi

(10) Patent No.: US 8,042,633 B2
(45) Date of Patent: Oct. 25, 2011

(54) DISCHARGING SYSTEM AND ELECTRIC VEHICLE

(75) Inventor: Toshiaki Nakanishi, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 77 days.

(21) Appl. No.: 12/026,378

(22) Filed: Feb. 5, 2008

(65) Prior Publication Data

US 2008/0190674 A1    Aug. 14, 2008

(30) Foreign Application Priority Data

Feb. 13, 2007    (JP) ................................ 2007-032294

(51) Int. Cl.
*H02J 7/14* (2006.01)
(52) U.S. Cl. ............... 180/65.29; 320/118; 320/104; 320/135
(58) Field of Classification Search .............. 320/104, 320/118, 121, 122, 124, 127–136; 180/65.1, 180/65.29, 65.31, 65.285
See application file for complete search history.

(56) References Cited

U.S. PATENT DOCUMENTS

| | | | | |
|---|---|---|---|---|
| 6,522,960 | B2 * | 2/2003 | Nada .............................. | 701/22 |
| 6,642,693 | B2 * | 11/2003 | Anzawa et al. ................ | 320/119 |
| 7,193,392 | B2 * | 3/2007 | King et al. ..................... | 320/118 |
| 7,245,108 | B2 * | 7/2007 | Chertok et al. ................ | 320/132 |
| 7,388,351 | B2 * | 6/2008 | Yudahira ........................ | 320/118 |
| 7,400,113 | B2 * | 7/2008 | Osborne ......................... | 320/118 |
| 7,400,114 | B2 * | 7/2008 | Anzawa et al. ................ | 320/119 |
| 2004/0135545 | A1 * | 7/2004 | Fowler et al. .................. | 320/118 |

FOREIGN PATENT DOCUMENTS

| | | |
|---|---|---|
| CN | 1481059 A | 3/2004 |
| CN | 2640097 Y | 9/2004 |
| JP | 11-234917 A | 8/1999 |
| JP | 2002-354698 A | 12/2002 |
| JP | 2003-189490 A | 7/2003 |
| JP | 2004-248348 A | 9/2004 |
| JP | 2005-261193 A | 9/2005 |
| JP | 2008-054416 A | 3/2008 |

OTHER PUBLICATIONS

Notice of Grounds for Rejection mailed Aug. 17, 2010, issued in corresponding Application No. JP 2007-032294, filed Feb. 13, 2007, 4 pages.

Office Action issued Jan. 29, 2010, in corresponding Chinese Application No. 200810005912.2.

* cited by examiner

*Primary Examiner* — J. Allen Shriver, II
*Assistant Examiner* — Erez Gurari
(74) *Attorney, Agent, or Firm* — Christensen O'Connor Johnson Kindness PLLC

(57) ABSTRACT

The operation of a discharging apparatus for correcting variations in voltage and remaining capacity among battery blocks forming a battery pack is performed more reliably. When power supply from a battery pack to a motor/generator is not being performed and when a variation amount of remaining capacity among the battery blocks forming the battery pack is larger than a predetermined value, a discharge request section issues a command to start power supply from a battery block to a discharge control unit corresponding to at least a battery block having the largest remaining capacity among the battery blocks. The discharge control unit receives the start command for power supply from the battery block and issues a command to a discharging section to discharge the battery block in response to start of the power supply from the battery block.

6 Claims, 3 Drawing Sheets

DISCHARGING SYSTEM AND ELECTRIC VEHICLE

PRIORITY INFORMATION

This application claims priority from Japanese Patent Application No. 2007-032294 filed on Feb. 13, 2007, which is incorporated herein by reference in its entirety.

BACKGROUND OF THE INVENTION

1. Field of the Invention

The present invention relates to a discharging system for correcting variations in remaining capacity between battery blocks forming a battery pack and an electric vehicle equipped with the discharging system.

2. Description of the Related Art

An electric vehicle, such as a pure electric vehicle (PEV) or a hybrid electric vehicle (HEV) that obtains vehicular driving force from an electric motor, has a secondary battery installed and the electric motor is driven by electric power stored in the secondary battery. Such an electric vehicle is equipped with regenerative braking, namely, a braking function having the electric motor function as a generator during vehicular braking where the kinetic energy of the vehicle is converted into electrical energy. The converted electrical energy is stored into the secondary battery and is reused when performing acceleration.

The secondary battery installed in such an above-mentioned electric vehicle is often configured as a battery pack in which multiple battery blocks are connected in series. The battery block is configured, for example, from multiple cells or multiple battery modules in which multiple cells are connected in series. In a secondary battery configured in this manner, variations in battery's capacitance or battery voltage may occur among battery blocks, such as due to operating environment.

Japanese Patent Laid-Open Publication H11-234917 discloses a technique for performing a comparison between an average no-load voltage of cell batteries forming the battery pack and a predetermined reference voltage while a hybrid electric vehicle is stopped, and performing variation correction on the basis of the comparison result.

Japanese Patent Laid-Open Publication 2002-354698 discloses a technique for controlling a power supply section to an ON state by a high level signal output from a microcomputer when capacitance adjustment of a battery pack is performed with a bypass resistor, and for performing capacitance adjustment until completed without interruption by continuously supplying power to the entire control circuit from the power supply section even after charging/discharging of the battery pack completes.

Japanese Patent Laid-Open Publication 2003-189490 discloses a technique for stopping the operation of all bypass circuits when the voltage or remaining capacity of an auxiliary device power source is less than or equal to a predetermined value in a system for driving a control apparatus controlling bypass circuits for performing an equalizing process to correct variations among cell batteries by supplying power from the auxiliary device power source.

SUMMARY OF THE INVENTION

If an auxiliary device power source is used to supply power to a discharging circuit for correcting variations in voltage or remaining capacity among battery blocks forming a battery pack, the discharging circuit may not operate normally depending on the remaining capacity of the power source, such as when the remaining capacity of the power source is less than or equal to a predetermined value.

It is therefore an object of the present invention to more reliably perform the operation of a discharging apparatus to be used, for example, for correcting variations in voltage or remaining capacity among battery blocks forming a battery pack.

A discharging system includes a discharging section, connected to a battery block to be discharged among battery blocks forming a battery pack, for discharging the battery block to be discharged, a discharge control unit operating from power supply from the battery block to be discharged and issuing a command to the discharging section to discharge the battery block to be discharged in response to start of the power supply, and a discharge request section for starting the power supply to the discharge control unit from the battery block to be discharged, if amount of variation of remaining capacity between battery blocks forming the battery pack is larger than a predetermined value with at least a battery block having the largest remaining capacity among the battery blocks as the battery block to be discharged.

According to one aspect of the discharging system relating to the present invention, the discharge control unit issues a command to the discharging section to stop discharging of the battery block to be discharged and further stops power supply from the battery block to be discharged if remaining capacity of the battery block to be discharged becomes less than a predetermined value.

A discharging system relating to the present invention includes a discharging section, connected to a battery block to be discharged among battery blocks forming the battery pack, for discharging the battery block to be discharged, a discharge control unit operating from power supply from the battery block to be discharged and for issuing a command to the discharging section to discharge the battery block to be discharged in response to start of the power supply, and a discharge request section for starting power supply to the discharge control unit from the battery block to be discharged if a battery block having a terminal voltage exceeding a predetermined first reference voltage is detected with at least the detected battery block as the battery block to be discharged.

According to one aspect of a discharging system relating to the present invention, the discharge control unit issues a command to the discharging section to stop discharging of the battery block to be discharged and further stops power supply from the battery block to be discharged if terminal voltage of the battery block to be discharged becomes smaller than a predetermined second reference voltage.

An electric vehicle relating to the present invention includes a motor/generator as a driving source, a battery pack composed from multiple battery blocks supplying power to the motor/generator, a discharging section connected to a battery block to be discharged from among the battery blocks composing the battery pack for performing discharge of the battery block to be discharged, a discharge control unit, operating from power supply from the battery block to be discharged, for issuing a command to the discharging section to discharge the battery block to be discharged in response to start of the power supply, and a discharge request section for judging discharge conditions are satisfied when a power supply from the battery pack is not being performed to the motor/generator and when variation amount of remaining capacity among battery blocks composing the battery pack is larger than a predetermined value, and for starting power supply from the battery block to be discharged to the discharge control unit with at least a battery block having maximum remaining capacity among battery blocks as the battery block to be discharged.

According to one aspect of the electric vehicle relating to the present invention, the discharge control unit issues a command to the discharging section to stop discharging of the battery block to be discharged and further stops the power supply the battery block to be discharged if remaining capacity of the battery block to be discharged becomes smaller than a predetermined reference value.

An electric vehicle relating to the present invention includes a motor/generator as a driving source, a battery pack composed from multiple battery blocks supplying power to the motor/generator, a discharging section connected to a battery block to be discharged from among the battery blocks composing the battery pack for performing discharge of the battery block to be discharged, a discharge control unit, operating from power supply from the battery block to be discharged, for issuing a command to the discharging section to discharge the battery block to be discharged in response to start of the power supply, and a discharge request section for judging discharge conditions are satisfied when a power supply from the battery pack is not being performed to the motor/generator and when a battery block having terminal voltage exceeding a predetermined first reference voltage is detected, and for starting power supply from the battery block to be discharged to the discharge control unit with at least the detected battery block as the battery block to be discharged.

According to one aspect of the electric vehicle relating to the present invention, the discharge control unit issues a command to the discharging section to stop discharging of the battery block to be discharged and further stops power supply from the battery block to be discharged.

According to one aspect of the electric vehicle relating to the present invention, an auxiliary device battery is provided, the discharge control unit issues a command to the discharging section to discharge the battery block to be discharged in response to start of the power supply from the auxiliary device battery, and the discharge request section starts power supply from the auxiliary device battery to the discharge control unit when the discharge conditions are satisfied and when remaining capacity of the auxiliary device battery is greater than or equal to a predetermined value, and starts power supply from the battery block to be discharged to the discharge control unit when the discharge conditions are satisfied and when remaining capacity of said auxiliary device battery is less than the predetermined value.

According to one aspect of the electric vehicle relating to the present invention, when the discharge control unit issues a command to the discharging section to discharge the battery block to be discharged in response to start of the power supply from the auxiliary device battery, the discharging section performs discharging of the battery block to be discharged by charging the auxiliary device battery with power from the battery block to be discharged.

According to the present invention, for example, the operation of the discharging apparatus to be used when correcting variations in voltage or remaining capacity among battery blocks forming the battery pack can be performed more reliably.

DETAILED DESCRIPTION OF THE PREFERRED EMBODIMENTS

A first embodiment specifically showing a best mode for implementing the present invention will be exemplified as a hybrid electric vehicle with reference to the attached drawings. It should be noted that although a hybrid electric vehicle is exemplified as one type of electric vehicle in the first embodiment, the first embodiment is also applicable to other electric vehicles equipped with a motor/generator as the driving source.

Figure 1:
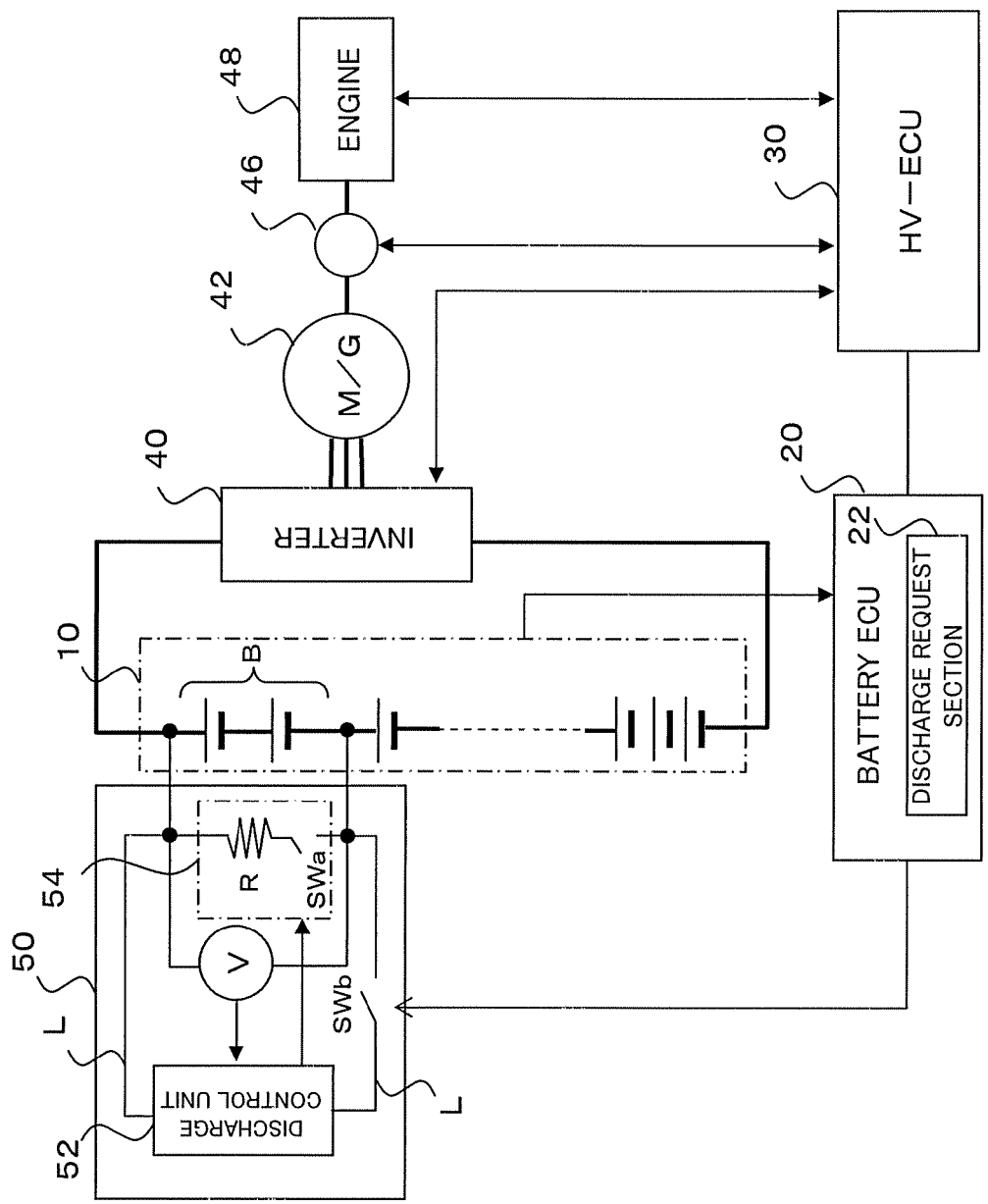
FIG. 1 shows a block diagram of a hybrid electric vehicle relating to a first embodiment.

FIG. 1 shows a block diagram of a hybrid electric vehicle relating to the first embodiment. In FIG. 1, a battery electronic control unit (hereinafter referred to as battery ECU) 20 receives information, such as battery voltage and battery temperature, from a battery pack 10 and estimates the SOC of the battery pack 10 with time, and transmits information, such as estimated SOC, battery voltage, and battery temperature, to a hybrid electronic control unit (hereinafter referred to as HV-ECU) 30. The HV-ECU 30 controls an inverter 40, a driving force distribution mechanism 46, and an engine 48. The battery ECU 20 acquires battery information at a predetermined period from the battery pack 10 via voltage, current, and temperature sensors (not shown). Here, for example, compared to the period during which power is supplied, the change in voltage and current of the battery pack 10 is gradual in the period during which power is not supplied to a motor/generator 42 from the battery pack 10. Accordingly, the acquisition period for battery information may be set so that the period during which power is not supplied from the battery pack 10 to the motor/generator 42 is longer than the period during which power is supplied. As a result, it is possible to reduce the power consumption by the battery ECU 20 from the acquisition of battery information. For example, in response to receiving a stop signal for the motor/generator 42, the battery ECU 20 may switch the acquisition period for battery information to a period longer than the period during which the motor/generator 42 is activated.

Furthermore, the battery ECU 20 includes a discharge request section 22. The discharge request section 22 acquires battery information, such as battery voltage, charging/discharging current, and battery temperature for each battery block from the battery pack 10 via the sensors and measures amount of variation of remaining capacity between battery blocks. For example, the discharge request section 22 identifies from among the battery blocks the battery block having the maximum remaining capacity and the battery block having the minimum remaining capacity, and if their difference is greater than or equal to a predetermined value, judges that there are variations in remaining capacity in the battery blocks. After judgment, if variations exist, the discharge request section 22 transmits a discharge request to a discharge device 50 corresponding to the battery block having the maximum capacitance. The discharge device 50 will be described hereinafter. When discharging is performed for the battery block, heat is generated from the discharging operation. On the other hand, if a hybrid electric vehicle travels by receiving a supply of power from the battery pack 10 and driving the motor/generator 42, heat is generated in the battery pack 10 and the ECUs. There is a risk that this heat generation may decrease the charging/discharging performance of the battery pack 10. Thus, there are instances where it is preferable to suppress the generation of heat. Furthermore, when the supply of power is received from the battery pack 10 and the motor/generator 42 is driven, the fluctuation of the terminal voltages of the battery blocks is relatively large and the charging/discharging current is relatively large. On the other hand, when the supply of power is received from the battery pack 10 and the motor/generator 42 is not driven, the terminal voltages of the battery blocks are relatively stable and the charging/discharging current is also relatively small. When the supply of power is received from the battery pack 10 and the motor/generator 42 is not driven, for example, the discharge request section 22 a discharge request may be transmitted while the vehicle is stopped or traveling only by the engine 48.

The discharge request section 22 receives a control signal relating to the drive of the inverter 40 from the HV-ECU 30, for example, and on the basis of the control signal, whether or not the supply of power is received from the battery pack 10 and the motor/generator 42 is driven can be detected. On the basis of the control signal, the discharge request section 22 judges whether or not charging or discharging is performed by the motor/generator 42, and if charging or discharging is not performed by the motor/generator 42, judges that a supply of power is not received from the battery pack 10. Furthermore, the discharge request section 22 acquires the charging/discharging current for the battery pack 10 via the current sensor and can perform detection on the basis of the magnitude of the charging/discharging current. Namely, if the charging/discharging current is smaller than a predetermined value, the discharge request section 22 can judge that the motor/generator 42 is not receiving a supply of power from the battery pack 10.

The battery pack 10 is configured by connecting multiple battery blocks B in series. Each battery block B is configured by electrically and serially connecting two battery modules. Furthermore, each battery module is configured by electrically and serially connecting six cells. The numbers of battery blocks, battery modules, and cells are not particularly limited to any quantity. The structure of the battery pack is also not limited to the above-mentioned example. The battery pack 10 is, more specifically, a nickel-metal hydride secondary battery or a lithium ion secondary battery.

The battery pack 10 is connected to the motor/generator (M/G) 42 via the inverter 40. The motor/generator 42 is connected with the engine (internal combustion) 48 via the driving force distribution mechanism 46 that includes a planetary gear mechanism.

Furthermore, in the first embodiment, the discharge device 50 for correcting variations in voltage or remaining capacity among battery blocks is provided for every battery block.

As described hereinabove, the discharge device 50 receives the discharge request transmitted from the discharge request section 22 and performs discharging of the battery block B to which it itself is connected.

The discharge device 50 includes a discharge control unit 52, a discharging section 54, and a voltage sensor V. The discharge control unit 52 and the discharging section 54 are connected in parallel to both ends of the battery block to be discharged. The discharge control section 52 is configured from a microprocessor, for example, connected to both ends of the battery block via a power supply lines L, and driven by receiving a supply of power from the battery block. A switch SWb is provided in the power supply line L for controlling the on-off state of the power supply from the battery block. When the discharge request is received from the discharge request section 22, the switch SWb turns on.

When the switch SWb turns on and the supply of power from the battery block starts, the discharge control unit 52 activates the system. When activation completes, a discharge command is output to the discharging section 54.

The discharging section 54 is connected in parallel to the battery block and is formed from a discharge element R and a switch SWa. The discharging section 54 receives a discharge command from the discharge control unit 52 and turns on the switch SWa. When the switch SWa turns on, current flows from the battery block to the discharge element R and discharging of the battery block is performed.

The discharge control unit 52 detects the terminal voltage of the battery block via the voltage sensor V, and when the terminal voltage of the battery block is smaller than a predetermined voltage value or the remaining capacity of the battery block is smaller than a predetermined reference value, outputs a discharge stop command to the discharging section 54 as well as turns off the switch SWb, cuts off the power supply from the battery block, and stops the system.

Figure 2:
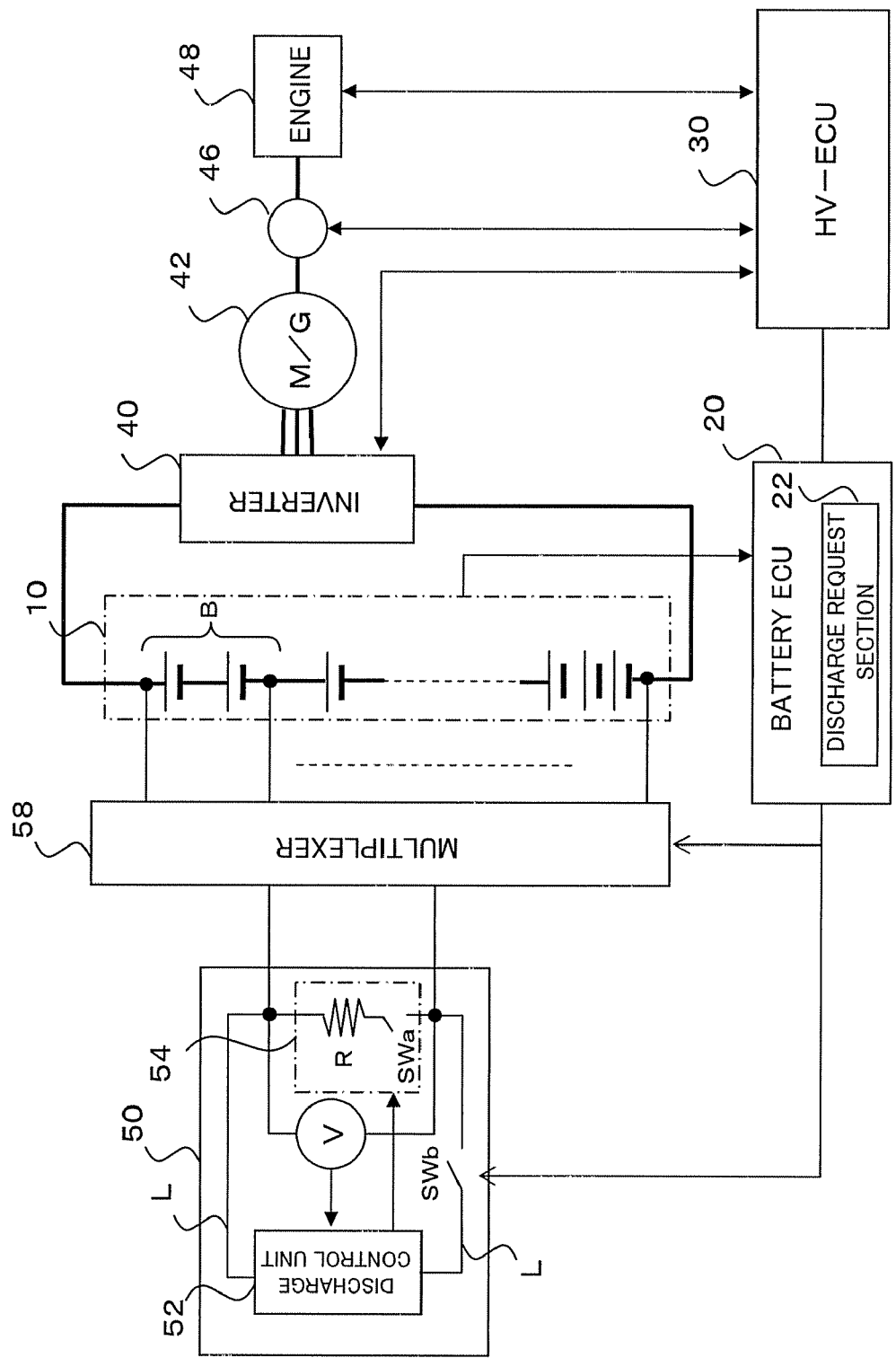
FIG. 2 shows a block diagram of a hybrid electric vehicle relating to a modified example of the first embodiment.

Hereinabove, a configuration providing the discharge device 50 for every battery block was described. However, for example, as shown in FIG. 2, the number of discharge devices 50 may be reduced by connecting at least two battery blocks to one discharge device 50 via a multiplexer 58. FIG. 2 shows a configuration where one multiplexer 58 is provided and all the battery blocks forming the battery pack 10 connect to one discharge device 50. However, multiple multiplexers may be provided, the battery blocks may be divided into multiple groups, and a discharge device may be provided for every group.

According to the first embodiment, the discharge device 50 directly receives a supply of power from the battery block to be discharged and performs discharging of the battery block. According to the above, the discharge command from the discharge request section 22 is transmitted to a battery block having extra remaining capacity compared to other battery blocks. For example, if the discharge device 50 operates by receiving a supply of power from an auxiliary device battery, there is a risk that operation may not be normal depending on the remaining capacity of the auxiliary device battery. However, according to the first embodiment, since a supply of power is received from a battery block having extra remaining capacity, the discharge device 50 will not fail to operate because a supply of power could not be received. Thus, according to the first embodiment, the operation of the discharge device for correcting variations in remaining capacity between battery blocks forming the battery pack can be performed reliably.

Next, a second embodiment will be described with reference to the attached drawing.

Figure 3:
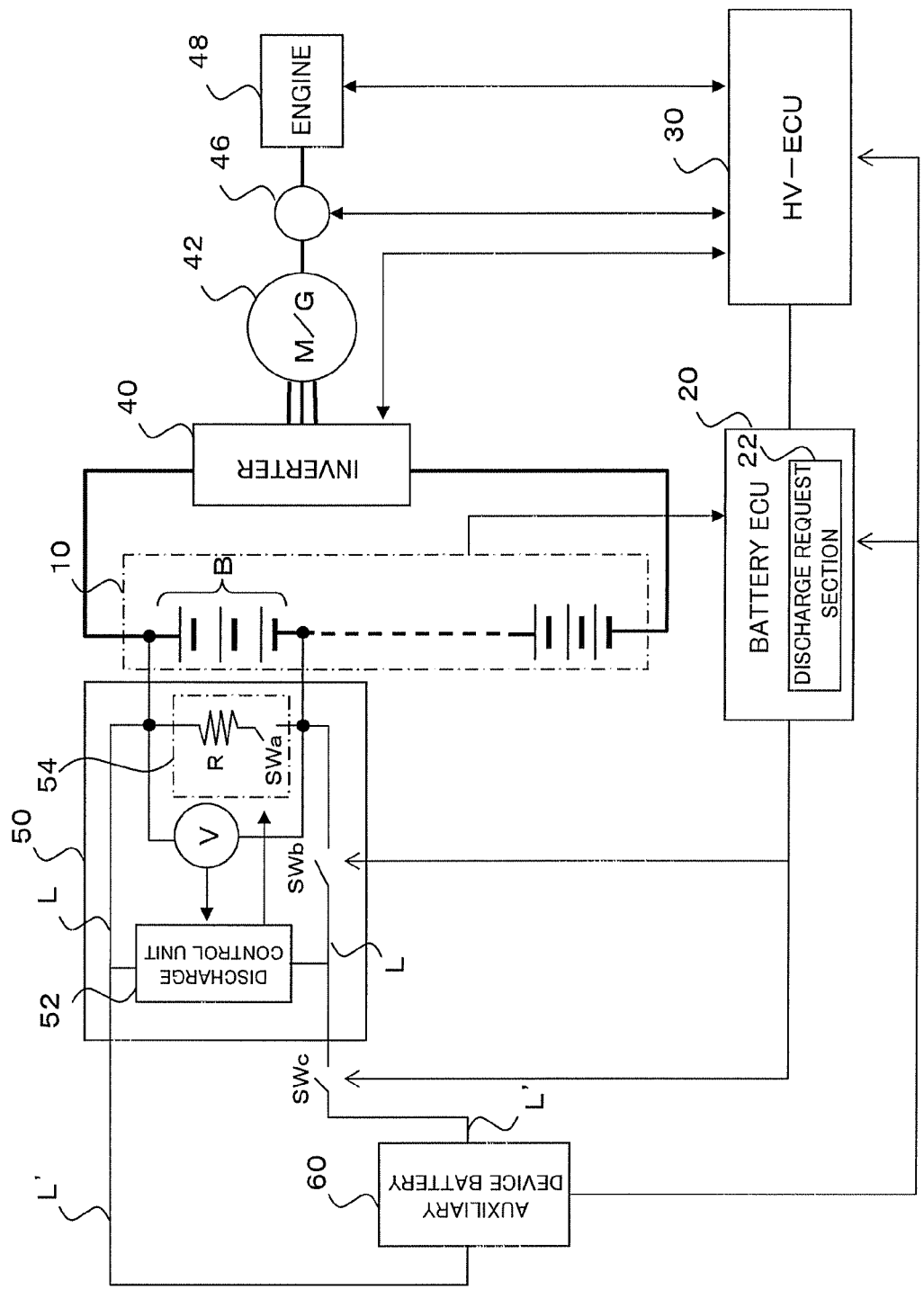
FIG. 3 shows a block diagram of a hybrid electric vehicle relating to a second embodiment.

FIG. 3 shows a block diagram of a hybrid electric vehicle relating to the second embodiment. In the hybrid electric vehicle relating to the second embodiment, the discharge device 50 is connected with an auxiliary device battery 60 supplying power, such as to the battery ECU 20 and the HV-ECU 30, via power supply lines L'. A switch SWc for turning on and off the supply of power from the auxiliary device battery 60 is provided in the power supply line L'. The discharge device 50 being able to receive the supply of power from the auxiliary device battery 60 by turning on the switch SWc in the second embodiment differs in that respect from the first embodiment. Parts in FIG. 3 identical to those shown in FIG. 1 are designated like reference characters and their descriptions will be omitted.

When the discharge request is transmitted in the second embodiment, the discharge request section 22 first acquires information on the remaining capacity of the auxiliary device battery 60 from the auxiliary device battery 60 and judges whether or not the remaining capacity is larger than a predetermined value. The discharge request section 22 may, for example, detect the terminal voltage of the auxiliary device battery 60 and calculate the remaining capacity on the basis of the detected result. As a result of the judgment, if the remaining capacity is larger than the predetermined value, the discharge request section 22 turns on the switch SWc for the discharge device 50 that is connected to the battery block to be discharged and the supply of power from the auxiliary device battery 60 to the discharge device 50 starts. Thereafter, the discharge device 50 performs discharging of the battery block in a similar manner to the first embodiment.

On the other hand, if the remaining capacity of the auxiliary device batter 60 is less than or equal to the predetermined value, the discharge request section 22 turns on the switch SWb for the discharge device 50 that is connected to the battery block to be discharged and the supply of power from the battery block to the discharge device 50 starts. Thereafter, the discharge device 50 performs discharging of the battery block in a similar manner to the first embodiment.

According to the second embodiment, the discharge device 50 can directly receive a supply of power from a battery block and can also receive a supply of power from the auxiliary device battery 60. Thus, the operation of the discharge device can be performed more reliably.

According to the second embodiment, even if a supply of power is directly received from a battery block, discharging of the battery block is performed by causing current to flow to the discharge element R. However, instead of causing current to flow to the discharge element R, discharging of the battery block may be performed by supplying power from the battery block to the auxiliary device battery 60 and charging the auxiliary device battery 60. As a result, variations in the remaining capacity between battery blocks are suppressed and the charging of the auxiliary device battery 60 can also be performed.

Furthermore, in the above-mentioned embodiments, an example was described where if variations in the remaining capacity develop between battery blocks, the discharge request section 22 requests the discharge of a battery block having extra remaining capacity compared to the other battery blocks. However, the condition for requesting the discharge operation is not limited to the above-mentioned example. For example, even if variations in the remaining capacity with other battery blocks are small and if the terminal voltage of a battery block is high, the battery block may be adversely influenced. For example, when a lithium ion secondary battery cell is used for the battery block and if the terminal voltage of the battery block exceeds a predetermined first reference voltage (for example, 4.2 V), deposition of metallic lithium may occur at the positive electrode of the battery block. If the discharge request section 22 monitors the terminal voltage of each battery block and detects a battery block having a terminal voltage exceeding the predetermined first reference voltage, with that battery block to be discharged the switch SWb for the discharge device 50 that is connected to that battery block may be turned on and the supply of power from the battery block to the discharge device 50 may be started. In this case also, if the discharge control unit 52 detects that the terminal voltage of the battery block to be discharged is smaller than a predetermined second reference voltage (which may be the same as the first reference voltage), a discharge stop command is output to the discharging section 54, the switch SWb is turned off, the power supply from the battery block is cut off, and the system is stopped.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A discharging system comprising:
  a discharging section, connected to a battery block to be discharged among battery blocks forming a battery pack, for discharging the battery block to be discharged;
  a discharge control unit connected in parallel with the discharging section to both ends of the battery block to be discharged, the discharge control unit is configured to operate from power supplied from the battery block to be discharged and to issue a command to the discharging section to discharge the battery block to be discharged in response to start of the power being supplied;
  a discharge request section that measures the amount of variation of remaining capacity between battery blocks and starts power supply to the discharge control unit connected to the battery block to be discharged, if amount of variation of remaining capacity between battery blocks forming the battery pack is larger than a predetermined value with at least a battery block having the largest remaining capacity among the battery blocks as the battery block to be discharged;
  a first switch in a line connecting the discharge control unit to the battery block to be discharged, wherein the switch is activated by the discharge request section; and
  a second switch in the discharging section that is activated by the discharge control unit to allow current flow from the battery block to be discharged,
  wherein the discharge control unit includes a microprocessor that receives power from the battery block to be discharged when the first switch is activated, and the discharge control unit issues a command to the discharging section to stop discharging of the battery block to be discharged and further stops power supply from the battery block to be discharged if remaining capacity of the battery block to be discharged becomes less than a predetermined value.

2. A discharging system comprising:
  a discharging section, connected to a battery block to be discharged among battery blocks forming a battery pack, for discharging the battery block to be discharged;
  a discharge control unit connected in parallel with the discharging section to both ends of the battery block to be discharged, the discharge control unit is configured to operate from power supplied from the battery block to be discharged and to issue a command to the discharging section to discharge the battery block to be discharged in response to start of the power being supplied;
  a discharge request section that measures the amount of variation of remaining capacity between battery blocks and starts power supply to the discharge control unit connected to the battery block to be discharged if a battery block having a terminal voltage exceeding a predetermined first reference voltage is detected with at least the detected battery block as the battery block to be discharged;
  a first switch in a line connecting the discharge control unit to the battery block to be discharged, wherein the switch is activated by the discharge request section; and
  a second switch in the discharging section that is activated by the discharge control unit to allow current flow from the battery block to be discharged,
  wherein the discharge control unit includes a microprocessor that receives power from the battery block to be discharged when the first switch is activated, and the discharge control unit issues a command to the discharging section to stop discharging from the battery block to be discharged and further stops power supply from the battery block to be discharged if terminal voltage of the battery block to be discharged becomes smaller than a predetermined second reference voltage.

3. An electric vehicle comprising:

a motor/generator as a driving source;

a battery pack composed from a plurality of battery blocks supplying power to the motor/generator;

a discharging section connected to a battery block to be discharged from among the battery blocks composing the battery pack for performing discharge of the battery block to be discharged;

a discharge control unit, connected in parallel with the discharging section to both ends of the battery block to be discharged, the discharge control unit is configured to operate from power supplied from the battery block to be discharged, and to issue a command to the discharging section to discharge the battery block to be discharged in response to start of the power being supplied; and a discharge request section that measures the amount of variation of remaining capacity between battery blocks and for judging discharge conditions are satisfied when power from the battery pack is not being supplied to the motor/generator and when a variation amount of remaining capacity among battery blocks composing the battery pack is larger than a predetermined value, and that starts power supply to the discharge control unit connected to the battery block to be discharged with at least a battery block having maximum remaining capacity among battery blocks as the battery block to be discharged;

a first switch in a line connecting the discharge control unit to the battery block to be discharged, wherein the switch is activated by the discharge request section; and a second switch in the discharging section that is activated by the discharge control unit to allow current flow from the battery block to be discharged, wherein the discharge control unit issues a command to the discharging section to stop discharging of the battery block to be discharged and further stops power supply from the battery block to be discharged if remaining capacity of the battery block to be discharged becomes smaller than a predetermined reference value.

4. An electric vehicle comprising:

a motor/generator as a driving source;

a battery pack composed from a plurality of battery blocks supplying power to the motor/generator;

a discharging section connected to a battery block to be discharged from among the battery blocks composing the battery pack for performing discharge of the battery block to be discharged;

a discharge control unit, connected in parallel with the discharging section to both ends of the battery block to be discharged, the discharge control unit is configured to operate from power supplied from the battery block to be discharged, and to issue a command to the discharging section to discharge the battery block to be discharged in response to start of the power being supplied; and a discharge request section that measures the amount of variation of remaining capacity between battery blocks and for judging discharge conditions are satisfied when a power supply from the battery pack is not being performed to the motor/generator and when a battery block having terminal voltage exceeding a predetermined first reference voltage is detected, and that starts power supply to the discharge control unit connected to the battery block to be discharged with at least the detected battery block as the battery block to be discharged;

a first switch in a line connecting the discharge control unit to the battery block to be discharged, wherein the switch is activated by the discharge request section; and a second switch in the discharging section that is activated by the discharge control unit to allow current flow from the battery block to be discharged, wherein the discharge control unit issues a command to the discharging section to stop discharging of the battery block to be discharged and further stops power supply from the battery block to be discharged.

5. An electric vehicle according to claim 3, further comprising an auxiliary device battery, wherein:

the discharge control unit configured to issue a command to the discharging section to discharge the battery block to be discharged in response to start of the power being supplied from the auxiliary device battery to the discharge control unit to operate the discharge control unit;

the discharge request section starts power supply from the auxiliary device battery to the discharge control unit when the discharge conditions are satisfied and when remaining capacity of the auxiliary device battery is greater than or equal to a predetermined value; and starts power supply from the battery block to be discharged to the discharge control unit when the discharge conditions are satisfied and when remaining capacity of the auxiliary device battery is less than the predetermined value.

6. An electric vehicle according to claim 5, wherein:

when the discharge control unit issues a command to the discharging section to discharge the battery block to be discharged in response to start of the power being supplied from the auxiliary device battery to the discharge control unit to operate the discharge control unit, the discharging section discharges the battery block to be discharged by charging the auxiliary device battery from power from the battery block to be discharged.

* * * * *